(No Model.)
A. R. SEARLES.
SHIPPING PACKAGE.
No. 351,208. Patented Oct. 19, 1886.
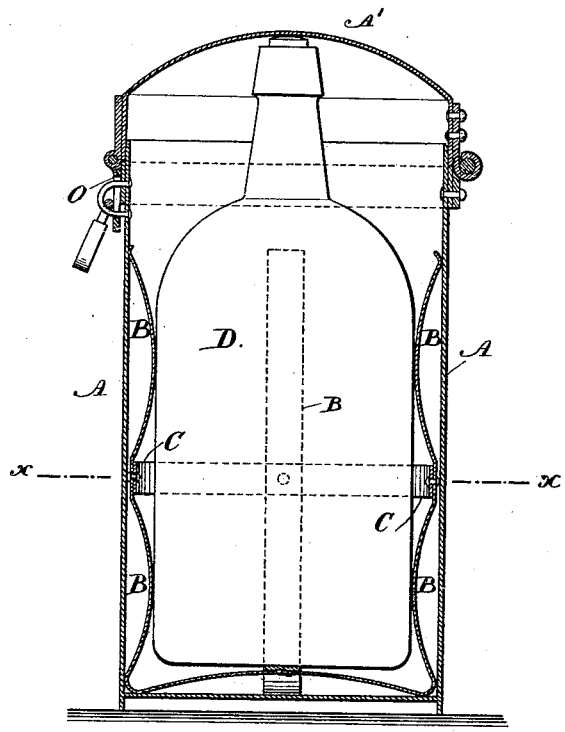
Fig. 1
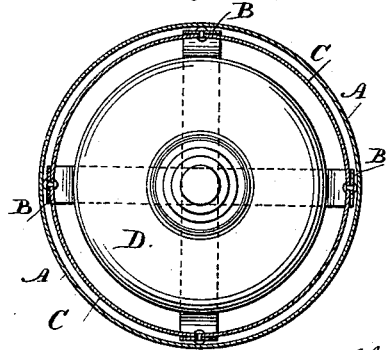
Fig. 2
Witnesses:
J. Staib
Chas. H. Smith
Inventor:
Albert R. Searles
per Lemuel W. Serrell
Atty

UNITED STATES PATENT OFFICE.

ALBERT R. SEARLES, OF NEW YORK, N. Y.

SHIPPING-PACKAGE.

SPECIFICATION forming part of Letters Patent No. 351,208, dated October 19, 1886.

Application filed July 19, 1886. Serial No. 208,410. (No model.)

*To all whom it may concern:*

Be it known that I, ALBERT R. SEARLES, of the city and State of New York, have invented an Improvement in Shipping-Packages for Glass, of which the following is a specification.

Shipping-packages for glass, demijohns, and other bottles have been made with rubber springs intervening between a metal case and the glass to prevent concussion.

My invention is for accomplishing a similar object in a cheap, convenient, and reliable manner.

I employ a case of sheet metal or other material of the proper strength and of a size adapted to receive the demijohn or other glass vessel, with corrugated or bow springs introduced between the glass and the metal case in such a manner as to prevent the glass coming in contact with the case, and at the same time to furnish an elastic or yielding support that prevents concussion on the glass or injury to the package.

In the drawings, Figure 1 is a vertical section of the package with the glass vessel inclosed; and Fig. 2 is a section at the line *x x*.

The inclosing-vessel is made of the case A and cover A'. These are preferably cylindrical and of a size to hold the glass jar or other package that is to be transported. The cover A' is to be slipped on or connected by a hinge, and at O is a hasp for a padlock or other fastening. Between the exterior of the glass vessel D and the interior of the case A there is sufficient space for the reception of bent or bow springs B B. These springs are of comparatively thin sheet-metal strips that are curved or of wave form, so as to fill up the spaces between the bottle and the package. These springs B are long enough to pass down upon one side of the bottle and beneath the same, and preferably extend upon the other side, so that the springs can be connected together at the intersection for retaining them in their proper places within the package or for withdrawing the same for cleaning the springs or package, or both. The band C passes around between the case and the bottle, and the springs B are connected to the same for retaining the parts in their proper relative positions.

In reference to Fig. 1 it will be seen that the glass bottle or package does not come into direct contact with the case; but the corrugated springs intervening permit a limited yielding movement of the case in relation to the bottle when the package is exposed to the concussion incident to travel or transportation. The springs, being bowed upwardly where they cross each other, raise the glass vessel off the bottom of the case and form a yielding support for the same.

I claim as my invention—

The package for a glass bottle or other vessel, composed of a metal case, wavy metal strips forming springs between the sides and bottom of the glass vessel and the metal case, and a metal band for connecting the springs together, so that they may be removed from the case, substantially as specified.

Signed by me this 14th day of July, A. D. 1886.

ALBERT R. SEARLES.

Witnesses:
GEO. T. PINCKNEY,
WILLIAM G. MOTT.